(12) United States Patent
Gupta et al.

(10) Patent No.: US 11,265,597 B2
(45) Date of Patent: Mar. 1, 2022

(54) METHODS AND SYSTEMS FOR PREDICTIVE BUFFERING OF RELATED CONTENT SEGMENTS

(71) Applicant: Rovi Guides, Inc., San Jose, CA (US)

(72) Inventors: Vikram Makam Gupta, Bangalore (IN); Vishwas Sharadanagar Panchaksharaiah, Tumkur District (IN)

(73) Assignee: ROVI GUIDES, INC., San Jose, CA (US)

( * ) Notice: Subject to any disclaimer, the term of this patent is extended or adjusted under 35 U.S.C. 154(b) by 36 days.

(21) Appl. No.: 16/168,656

(22) Filed: Oct. 23, 2018

(65) Prior Publication Data

US 2020/0128294 A1    Apr. 23, 2020

(51) Int. Cl.
| | | |
|---|---|---|
| H04N 21/44 | (2011.01) | |
| G06F 16/683 | (2019.01) | |
| H04N 21/442 | (2011.01) | |
| H04N 21/845 | (2011.01) | |

(52) U.S. Cl.
CPC ..... *H04N 21/44004* (2013.01); *G06F 16/685* (2019.01); *H04N 21/44222* (2013.01); *H04N 21/8456* (2013.01)

(58) Field of Classification Search
CPC ....... H04N 21/44004; H04N 21/44222; H04N 21/8456; H04N 21/2387; G06F 16/685
See application file for complete search history.

(56) References Cited

U.S. PATENT DOCUMENTS

| | | | |
|---|---|---|---|
| 7,702,805 B1 | 4/2010 | Kapoor | |
| 7,761,892 B2 * | 7/2010 | Ellis | H04N 21/4334 725/44 |
| 8,046,801 B2 * | 10/2011 | Ellis | H04N 21/8126 725/58 |
| 8,508,661 B1 * | 8/2013 | Masterson | H04N 7/012 345/606 |
| 9,204,186 B2 | 12/2015 | Harvey | |
| 9,473,548 B1 * | 10/2016 | Chakrovorthy | H04N 21/472 |
| 9,473,820 B2 * | 10/2016 | Mallinson | G06K 9/00758 |

(Continued)

FOREIGN PATENT DOCUMENTS

| | | |
|---|---|---|
| WO | WO2010108053 | 9/2010 |
| WO | WO2012013226 | 2/2012 |

OTHER PUBLICATIONS

U.S. Appl. No. 09/332,244, filed Jun. 11, 1999, Ellis.
European Search Report for European Application No. EP 19199688.3, dated Jan. 30, 2020 (10 pages).

*Primary Examiner* — Jimmy H Tran
(74) *Attorney, Agent, or Firm* — Haley Guiliano LLP

(57) ABSTRACT

The methods and systems described herein aid users by providing thorough and efficient content consumption. For example, the methods and systems buffer content segments related to a current portion of the content that the system is generating for display. The methods and systems determine a characteristic of the current portion of the content and related content segments based on the characteristic. Confidence scores are determined by the systems and methods for each of the related content segments, and one or more related content segments with higher confidence scores are buffered in memory. Accordingly, the methods and systems described herein provide a thorough viewing of content through related segments that are buffered in memory for quick access.

20 Claims, 8 Drawing Sheets

(56) References Cited

U.S. PATENT DOCUMENTS

| | | | |
|---|---|---|---|
| 9,510,024 B2* | 11/2016 | Oman | H04N 21/23406 |
| 9,510,051 B1* | 11/2016 | Bostick | H04N 21/44204 |
| 10,055,494 B1* | 8/2018 | Bordenet | G06F 16/738 |
| 10,397,343 B1* | 8/2019 | Goldberg | H04L 67/22 |
| 10,425,665 B2* | 9/2019 | Oman | H04N 21/2183 |
| 10,455,297 B1* | 10/2019 | Mahyar | G10L 15/1815 |
| 10,911,815 B1* | 2/2021 | McCarthy | G11B 27/32 |
| 2004/0184526 A1 | 9/2004 | Penttila | |
| 2005/0251827 A1* | 11/2005 | Ellis | H04N 7/17318 |
| | | | 725/47 |
| 2009/0169179 A1 | 7/2009 | Johnson | |
| 2010/0031193 A1* | 2/2010 | Stark | H04N 21/4131 |
| | | | 715/810 |
| 2012/0099514 A1* | 4/2012 | Bianchetti | H04N 21/41422 |
| | | | 370/312 |
| 2012/0222065 A1* | 8/2012 | Prins | H04N 21/432 |
| | | | 725/32 |
| 2012/0331106 A1* | 12/2012 | Ramamurthy | |
| | | | H04N 21/234327 |
| | | | 709/218 |
| 2013/0173742 A1* | 7/2013 | Thomas | H04L 65/602 |
| | | | 709/217 |
| 2013/0297706 A1* | 11/2013 | Arme | H04N 5/765 |
| | | | 709/206 |
| 2014/0129570 A1* | 5/2014 | Johnson | H04N 21/4788 |
| | | | 707/748 |
| 2014/0149555 A1* | 5/2014 | Bank | H04L 65/60 |
| | | | 709/219 |
| 2014/0173070 A1* | 6/2014 | Morrison, III | H04N 21/23106 |
| | | | 709/223 |
| 2015/0023404 A1* | 1/2015 | Li | H04N 19/152 |
| | | | 375/240.02 |
| 2015/0039714 A1* | 2/2015 | Venturi | H04L 65/60 |
| | | | 709/213 |
| 2015/0082338 A1* | 3/2015 | Logan | H04N 21/812 |
| | | | 725/32 |
| 2016/0080780 A1* | 3/2016 | Oman | H04N 21/23406 |
| | | | 725/10 |
| 2016/0112762 A1* | 4/2016 | Mallinson | G06K 9/00758 |
| | | | 725/18 |
| 2016/0173941 A1* | 6/2016 | Gilson | H04N 21/454 |
| | | | 725/14 |
| 2017/0017652 A1* | 1/2017 | Neumeier | G06F 16/783 |
| 2017/0032820 A1 | 2/2017 | Davis et al. | |
| 2017/0048563 A1* | 2/2017 | Oman | H04N 21/23406 |
| 2017/0195734 A1* | 7/2017 | Park | H04N 21/42224 |
| 2017/0257410 A1* | 9/2017 | Gattis | H04N 21/8455 |
| 2017/0257654 A1* | 9/2017 | Branch | H04L 51/24 |
| 2017/0280208 A1* | 9/2017 | Mishra | G06K 9/00718 |
| 2017/0359690 A1 | 12/2017 | Crutchfield et al. | |
| 2018/0035140 A1* | 2/2018 | Li | H04N 21/23439 |
| 2018/0103276 A1* | 4/2018 | Piron | H04N 21/8456 |
| 2018/0129273 A1* | 5/2018 | Thorwirth | H04N 21/4532 |
| 2018/0144775 A1 | 5/2018 | Taine et al. | |
| 2019/0045271 A1* | 2/2019 | Christie | H04N 21/21815 |
| 2019/0208263 A1* | 7/2019 | Chamberlin | G06F 16/78 |
| 2019/0238924 A1* | 8/2019 | Stumbo | H04N 21/25891 |
| 2019/0289359 A1* | 9/2019 | Sekar | H04N 21/4316 |
| 2019/0349633 A1* | 11/2019 | Wannamaker | H04N 21/6543 |
| 2019/0373296 A1* | 12/2019 | Oakley | H04N 21/2401 |
| 2020/0007815 A1* | 1/2020 | Zdepski | H04N 21/44016 |
| 2020/0037047 A1* | 1/2020 | Cheung | H04N 21/8545 |
| 2020/0037048 A1* | 1/2020 | Cheung | H04N 21/23406 |
| 2020/0099979 A1 | 3/2020 | Panchaksharaiah | |
| 2020/0128292 A1* | 4/2020 | Bumgarner | H04N 21/44008 |
| 2020/0145701 A1* | 5/2020 | Liu | H04N 9/8205 |
| 2020/0162530 A1* | 5/2020 | Furtwangler | H04L 65/4092 |
| 2020/0275163 A1* | 8/2020 | Danovitz | H04N 21/252 |
| 2020/0293787 A1* | 9/2020 | Badr | G06F 16/434 |
| 2021/0099755 A1 | 4/2021 | Panchaksharaiah et al. | |
| 2021/0204010 A1* | 7/2021 | Hou | H04N 21/4316 |
| 2021/0241607 A1* | 8/2021 | Rhoads | H04N 5/23219 |

* cited by examiner

METHODS AND SYSTEMS FOR PREDICTIVE BUFFERING OF RELATED CONTENT SEGMENTS

BACKGROUND

The present disclosure relates to content output systems and, more particularly, to content output systems that buffer content segments based on segment characteristics.

SUMMARY

Methods and systems are described herein for buffering content segments in content output systems. Streaming on-demand content is a popular way to consume content. Users can watch or listen to content according to their schedules. In some situations, users may want to play content out of chronological order. For example, a long period of time may have passed since a user has resumed playing a partially watched episode of an adventure series. In conventional systems, if a user wants a reminder of what last happened to the characters before the scene he is currently viewing, the user will need to manually rewind the episode to find the related, previous scene. With content having increased length and story complexity, manually rewinding unnecessarily wastes time, and if a user does not rewind, this can lead to an incomplete or disorienting experience.

The solutions to the problems described above include identifying segment characteristics and buffering content segments in response. For example, when a user continues playing an episode of an adventure series from the halfway mark, a characteristic (e.g., an actor) of that scene can be identified, and in turn, related segments sharing that characteristic can be buffered. Accordingly, the methods and systems described herein provide a thorough content consumption experience while saving time for the user because the user will not have to trawl through content to find related segments manually.

Systems and methods are described herein for buffering segments of content based on segment characteristics. In some embodiments, the system generates for display content (e.g., a television episode). The system determines a current portion of the content and a characteristic (e.g., an actor) of that portion. The system determines other segments related to the current portion based on its determined characteristic. The system also determines confidence scores for each of the other segments. The extent of confidence may be based on the likelihood of the user switching to each of them from the current portion. Based on the determined confidence scores, the system buffers one or more of the related segments that have higher confidence scores.

It should be noted that the methods and systems described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Methods and systems are described herein for buffering segments of content based on segment characteristics.

Figure 1:
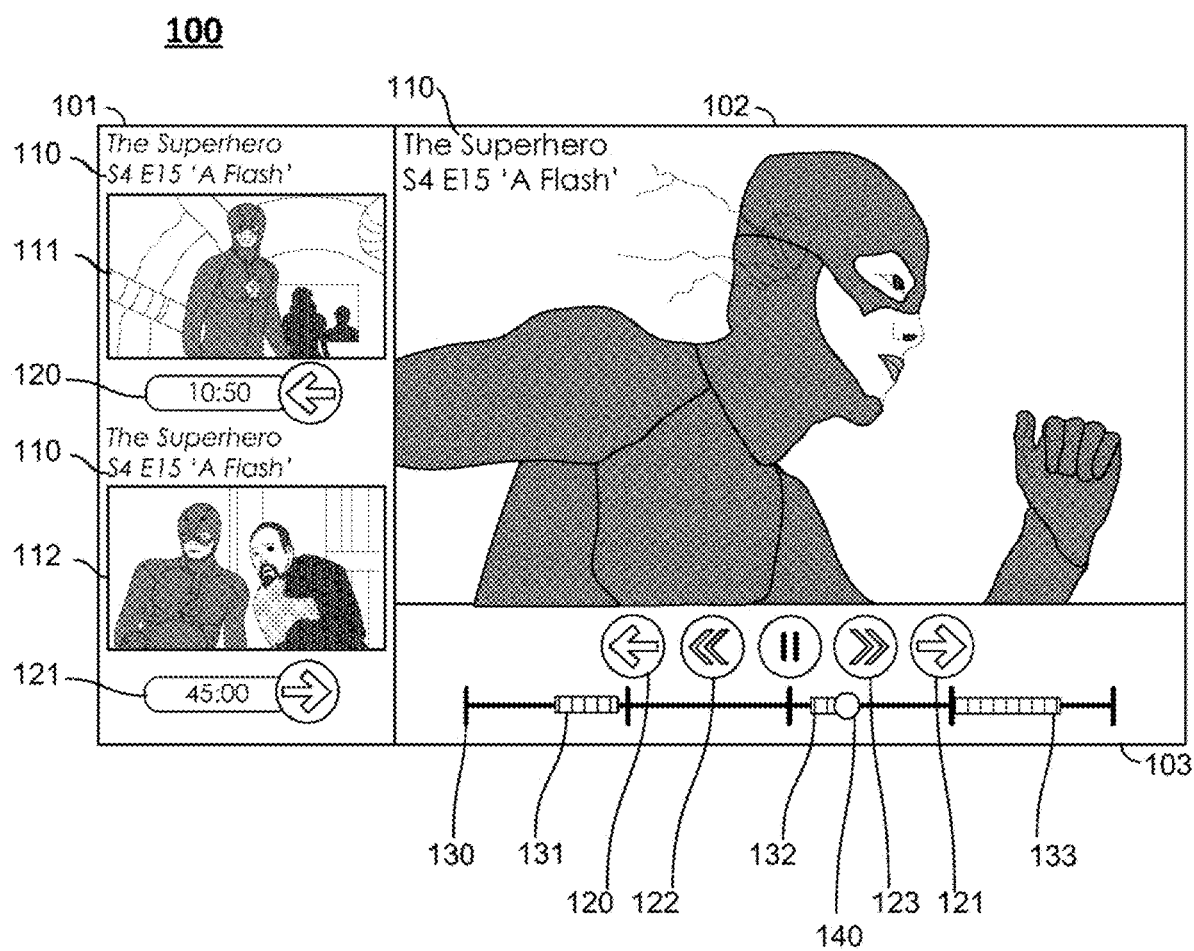
FIG. 1 shows an illustrative example of a content output system display presenting related segments within the same content, in accordance with some embodiments of the disclosure.

FIG. 1 shows an illustrative example of a content output system display 100 presenting related segments within the same content, in accordance with some embodiments of the disclosure. For example, the user may be watching the fifteenth episode of season four of a television show entitled "The Superhero," as shown by content details 110. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, and/or any other media and/or combination of the same. Content may be recorded, played, displayed or accessed by devices, but can also be part of a live performance. Content output system display 100 is partitioned such that it includes a related-segments section 101, a currently presenting section 102, and a time-seek section 103. Content output system display 100 can belong to a smartphone, tablet, virtual reality headset, television, any electronic device for content consumption, or any suitable combination thereof.

The currently presenting section 102 may display a portion of a television episode with a superhero using his superpowers. The related-segments section 101 may display information about other segments of content related to the currently-presented content. As shown, other segments from the same episode are being displayed in the related-segments section 101. In some embodiments, the system can determine a likelihood that the user will navigate from the current portion of the episode by using, for example, user viewing history, profile, mood, or interests. In some embodiments, after determining that the user is likely to navigate away, the system may determine segments related to a characteristic of the current portion. This characteristic may be related to the metadata (e.g., director, minute mark, writer) or the context of the current portion (e.g., characters, activity, music, scenery).

Using the context of the current portion of the content in the currently presenting display 102, the system may determine a characteristic that is used to find related media segments that have a relationship with the characteristic. The relationship can be direct or indirect. The related-segments section 101 may show related segments determined through a direct relationship such as a shared character, actor, or sound that is unique to the character (e.g., the sound of the superhero using his superpower). If the system cannot find a direct relationship, the system may find a segment related indirectly (e.g., a related scene has an adversary of the character). The related previous segment 111 and next segment 112 may be shown in related-segments section 101. As shown, previous segment 111 and next segment 112 correspond to a prior time 120 and a following time 121, respectively, of the current scene displayed in the currently presenting section 102. Related segments section 101 may also include content details 110 that may show the season and the episode number of the related segments. As depicted, the season is the four and the episode entitled "A Flash" is the fifteenth episode for the two related segments.

The related segments may be within the same episode of the television series as specified by content details 110 of FIG. 1. In the related-segments section 101, the user may be given a preview of the segments that the system can skip to. In some embodiments, the previews shown for related previous segment 111 and next segment 112 show the same superhero character as in the currently playing portion of the episode, reflecting that as the characteristic the system is using to find related segments.

The system may determine related segments based on a user profile and extents to which segments are characterized by the user profile. The extents to which segments are characterized by an attribute of the user profile may be based upon the matching characteristics between the user profile and the segments. For example, the more characteristics of a segment correspond to interests indicated in a user profile, the higher the extent that the segment is characterized by the user profile. If there are no user interests that characterize the segment (e.g., no actor, location, genre, or music that the user likes), there is a minimal or nonexistent extent to which the segment is characterized by the user profile. A user profile may include one or more of a viewing history, mood, previously favorited or liked content, location, or list of interests (e.g., hobbies, actors, books, characters, authors, screenwriters, directors, etc.). The system may also determine related segments using the user profiles of other users, their interests, or their likelihoods of skipping from the current portion of the segment to another segment.

Time-seek section 103 may provide traditional selection buttons to navigate through a segment of the content episode through manual rewind button 122 and fast-forward button 123. Distinctively, time-seek section 103 may also provide previous-segment-seek button 120 and following-segment-seek button 121 that skip directly to a buffered segment related to the currently playing portion of the episode. The previous segment may be chronologically before the current portion, which is playing at the time indicated by the present-time indicator 140. For example, the indicator 140 on progress bar 130 may indicate 35:00 as the present minute mark of the current segment 132 that was buffered when the user began watching at the 32:00-minute mark. In some embodiments, progress bar 130 may only display content segments buffered by the system in memory that are related to the current portion of content. In other embodiments, progress bar 130 may display all content segments buffered in memory available to access. For example, if all segments of the episode specified by content details 110 were buffered in memory, the entire progress bar 130 may be covered by the indicator used for segments 131, 132, and 133. Previous-segment-seek button 120 may correspond to a scene that occurs at the 10:50-minute mark. Similarly, the following-segment-seek button 121 may correspond to a scene that occurs at the 45:00-minute mark. Both sets of segment-seek buttons 120 and 121 in sections 103 and 101 may be used to seek previous and next related segments. When the user accesses the scenes by those buttons, the content will be played almost immediately, because the system has already buffered them in memory. This is indicated by the buffered previous-segment indicator 131 and the buffered following-segment indicator 133.

Figure 2:
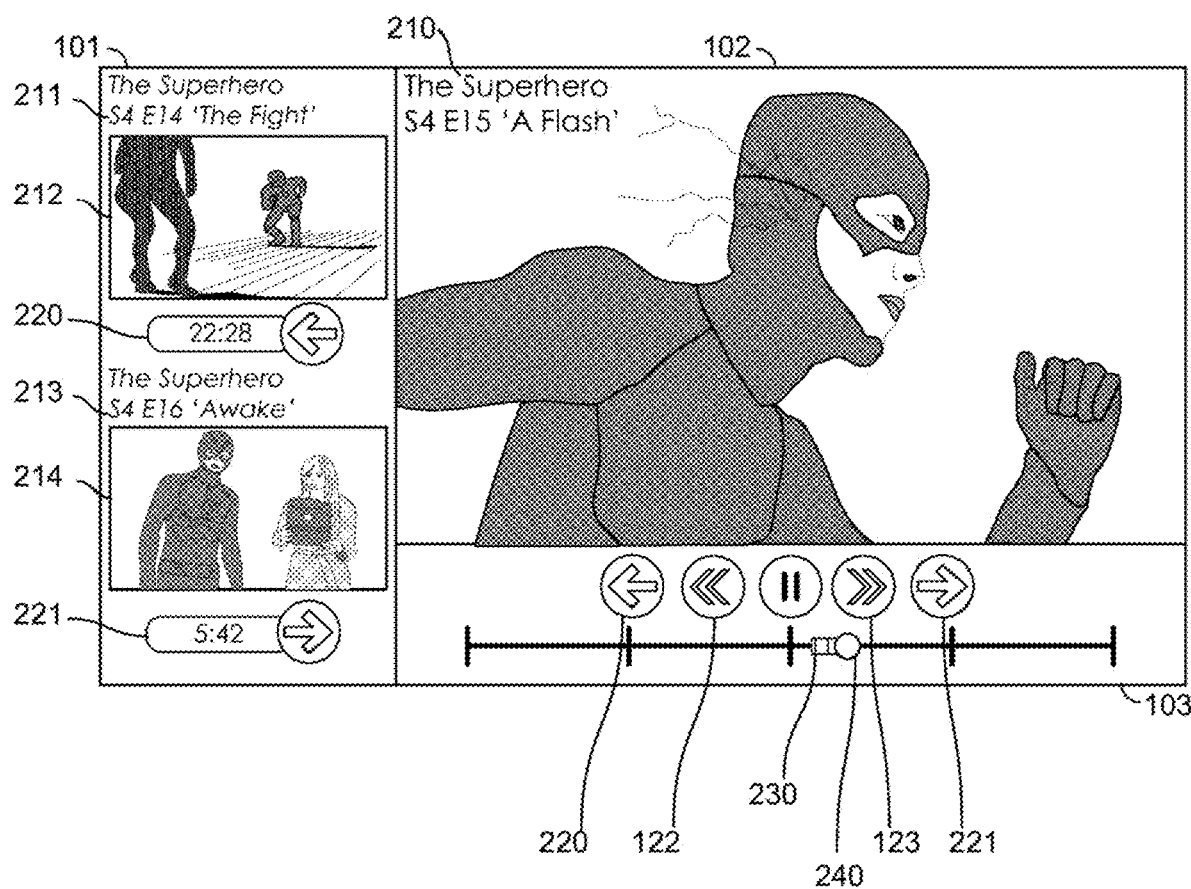
FIG. 2 shows an illustrative example of a content output system display presenting related segments from different content, in accordance with some embodiments of the disclosure.

FIG. 2 shows an illustrative example of a content output system display 200 presenting related segments from different content, in accordance with some embodiments of the disclosure. For example, the user may be watching the fifteenth episode of season four of a television show entitled "The Superhero," as shown by content details 210. The display 200 in FIG. 2 is arranged similarly to that of FIG. 1, but a distinguishing feature is that the buffered segments are not a part of the current episode being presented.

The user may want to find related segments outside of the current episode being presented. In some embodiments, the system determines that the user wishes to navigate away from the current scene because the time since the user has last viewed this episode was over a certain time ago (e.g., the user last watched this portion a month ago), and the user may want to review the series of events that led up to the currently-presented segment 230. The user may have, in a previous viewing of the currently-presented segment, navigated away from the 35:00-minute mark to the previous segment 212 at the 22:28-minute mark of the previous episode, and the system may use this viewing pattern to retrieve related segments in related-segment section 201. The system may determine another reason that the user would navigate away from this scene is to view similar scenes. For example, the user may want to view scenes of other episodes from the television series containing the same actor in the currently-presented segment 230. The user can use previous-segment-seek button 220 to skip to a segment in a previous episode that is related to the current portion displayed. For example, the selection of button 220 will almost immediately cause the system to output the buffered segment of the previous episode of "The Superhero" beginning at the 22:28-minute mark. In some embodiments, this time corresponds to the scene with the greatest relationship to the current portion of the episode being displayed. The current episode information is indicated by current episode content details 210. As another example, the selection of button 221 will almost immediately cause the system to output the buffered segment of the next episode of "The Superhero" beginning at the 5:42-minute mark. Button 121 of FIG. 1 and button 221 of FIG. 2 may be displayed as the same type of button by the system, or there may be two distinct sets of buttons for seeking related segments following the current scene in the same content and different content. Similarly, buttons 120 of FIG. 1 and 220 of FIG. 2 may be displayed as the same type of button for seeking prior segments within the same content and different content, or as two distinct sets of buttons. Segments in the prior and next episode of a television series can be related to the current portion presented due to a shared characteristic of the on-screen character. As shown in FIG. 2, in the previous episode, the related segment is a fight that the superhero is engaging in. In the next episode, the related segment is the superhero talking to a civilian.

In some embodiments, the system determines that the user wants to navigate away from the scene because his favorite character is not shown and will find a segment with a higher likelihood of interest to the user based on a user profile attribute such as "favorite character." In such embodiments, the system retrieves the female civilian character as a user favorite and determine that the next segment 214 featuring her is in the sixteenth episode at the 5:42-minute mark.

Figure 3:
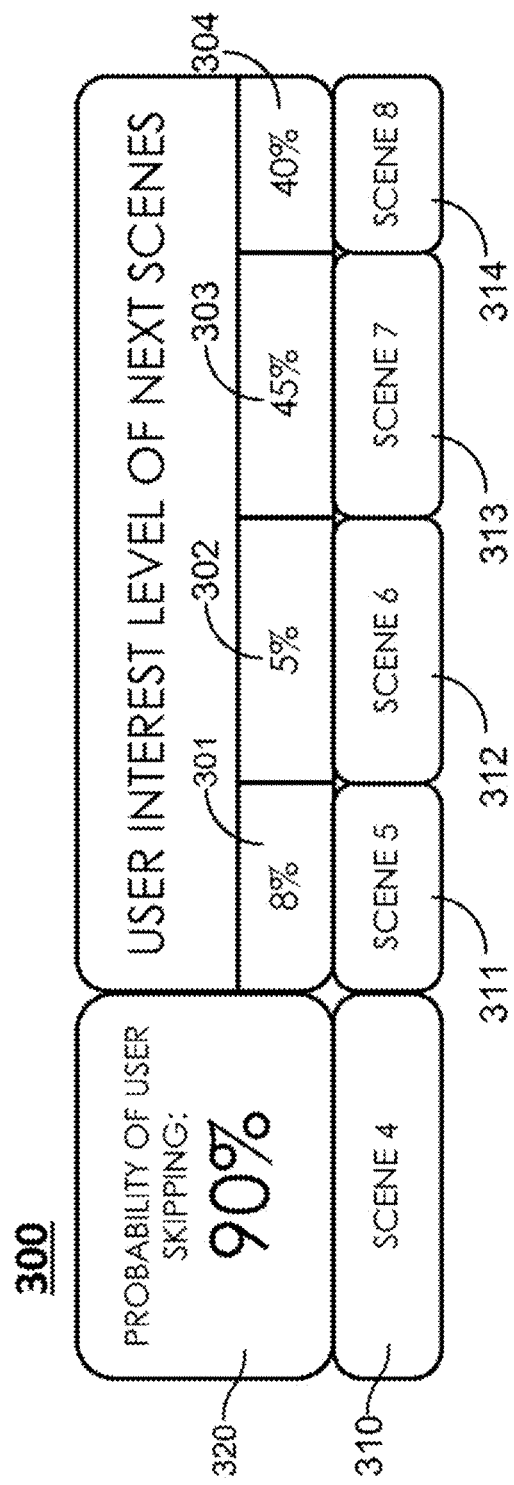
FIG. 3 shows an illustrative example of a chart organizing related segments with confidence scores, in accordance with some embodiments of the disclosure.

FIG. 3 shows an illustrative example of a chart 300 organizing related segments with confidence scores, in accordance with some embodiments of the disclosure. The system may provide the user the option to view chart 300 and may further provide the user the ability to interact with the chart 300. For example, the system may allow interactions such that the user may navigate away from the current portion of content by choosing another segment. In some embodiments, the content may be a movie or television episode comprising scenes. As the user is consuming the content (e.g., as shown in FIG. 1), the system may perform calculations to determine the values shown in chart 300. Chart 300 presents the probability 320 of the user navigating away from or skipping the current scene 310. For example, the probability of the user skipping the fourth scene of a movie may be 90%, indicating that the user will want to watch a different part of the movie. This probability may be determined by a comparison of a characteristic of the current portion and an attribute of the user profile. For example, when the scene of the movie is very tragic, and the user profile reflects that the user is currently sad, the system uses the mood of the user to determine a high probability he will skip the sad scenes of the movie.

Chart 300 may present an analysis of the consecutive, upcoming scenes or of related segments that are not necessarily consecutive or upcoming. For example, the fifth scene 311 through the eighth scene 314 are analyzed by the system to determine how interested the user would be in the respective scenes. In the same example, the system determines that, based on a characteristic in the respective scene and an attribute in the user profile, the user would be likely to navigate from the fourth scene 310 to the fifth scene 311, sixth scene 312, seventh scene 313, and eighth scene 314, with confidence scores or interest levels 301-304 of 8%, 5%, 45%, and 40%, respectively (e.g., 40 of 100 times the user navigates away from the fourth scene, the user will navigate to the eighth scene). As referred to herein, the term "confidence score" should be understood to mean a representation of the extent of interest in a segment and may also be referred to as "interest level" or "extent of interest." Chart 300 may present an analysis of content segments that are not consecutive. For example, the chart may show the confidence scores of the user navigating away from the current scene to the first, third, sixth, and seventh scenes in a movie.

The system may determine to, when the highest two confidence scores are both higher than some threshold confidence score, buffer both the corresponding segments. For example, when the seventh scene 313 has a confidence score 303 of 45%, the eighth scene 314 has a confidence score 304 of 40%, and the threshold confidence score is 35%, the system may buffer both scenes. The system can also determine to buffer only the segment with the highest confidence score. For example, the system may buffer only the seventh scene 313 because it has the highest confidence score 303 of 45%. In some embodiments, the system may determine to buffer all scenes whose confidence scores fall within a predetermined range of the highest confidence score. For example, when the predetermined range is 5% above or below the highest confidence score, the seventh scene has the highest confidence score of 45%, and the eighth scene has the second-highest score of 40%, the system may buffer both the seventh and eighth scenes.

Figure 4:
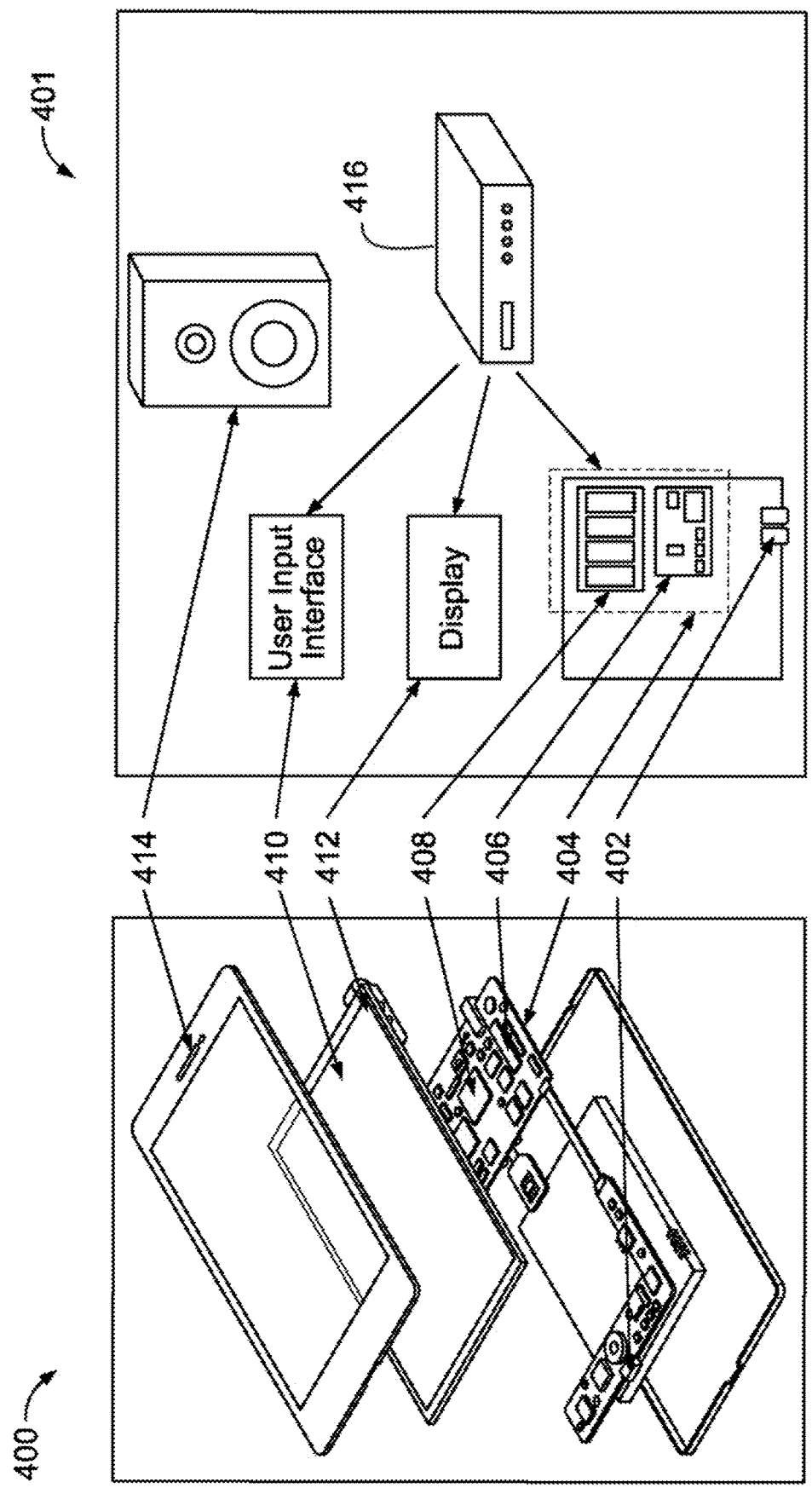
FIG. 4 is a block diagram of an illustrative content output system, in accordance with some embodiments of the disclosure.

Users may access content from one or more of their devices. FIG. 4 shows generalized embodiments of a device capable of presenting content on a display 412. For example, display 412 may belong to a smartphone device. In another example, display 412 may belong to a user television equipment system. User television equipment system with display 412 may include a set-top box 416. Set-top box 416 may be communicatively connected to speaker 414, and display 412. In some embodiments, display 412 may be a television display or a computer display. In some embodiments, set top box 416 may be communicatively connected to user interface input 410. In some embodiments, user interface input 410 may be a remote control device. Set-top box 416 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of devices are discussed below in connection with FIG. 5. Each one of device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a application stored in memory (e.g., storage 408). Specifically, control circuitry 404 may be instructed by the application to perform the functions discussed above and below. For example, the application may provide instructions to control circuitry 404 to monitor words spoken by a user and determine whether they match words in the content that is being output. In some implementations, any action performed by control circuitry 404 may be based on instructions received from the application.

In client-server based embodiments, control circuitry 404 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, buffered related content segments and metadata files used in the determination of characteristics of current portions of content or the related content segments based on determined characteristics. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores metadata files of content, a look-up table mapping content segments or timestamped content to characteristics or related content segments, any suitable reference for control circuitry to retrieve when determining a characteristic of a current portion of content or related content segments, or any suitable combination thereof.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

The content application may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the application is a client-server based application. Data for use by a thick or thin client implemented on each one of device 400 and user equipment system 401 is retrieved on-demand by issuing requests to a server remote to each one of device 400 and user equipment system 401. In one example of a client-server based content application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the content application is downloaded and interpreted or otherwise run by an interpreter or virtual machine (run by control circuitry 404). In some embodiments, the content application may be encoded in the ETV Binary Interchange Format (EBIF), received by control circuitry 404 as part of a suitable feed, and interpreted by a user agent running on control circuitry 404. For example, the content application may be an EBIF application. In some embodiments, the content application may be defined by a series of JAVA-based files that are received and run by a local virtual machine or other suitable middleware executed by control circuitry 404. In some of such embodiments (e.g., those employing MPEG-2 or other digital media encoding schemes), the content application may be, for example, encoded and transmitted in an MPEG-2 object carousel with the MPEG audio and video packets of a program.

Figure 5:
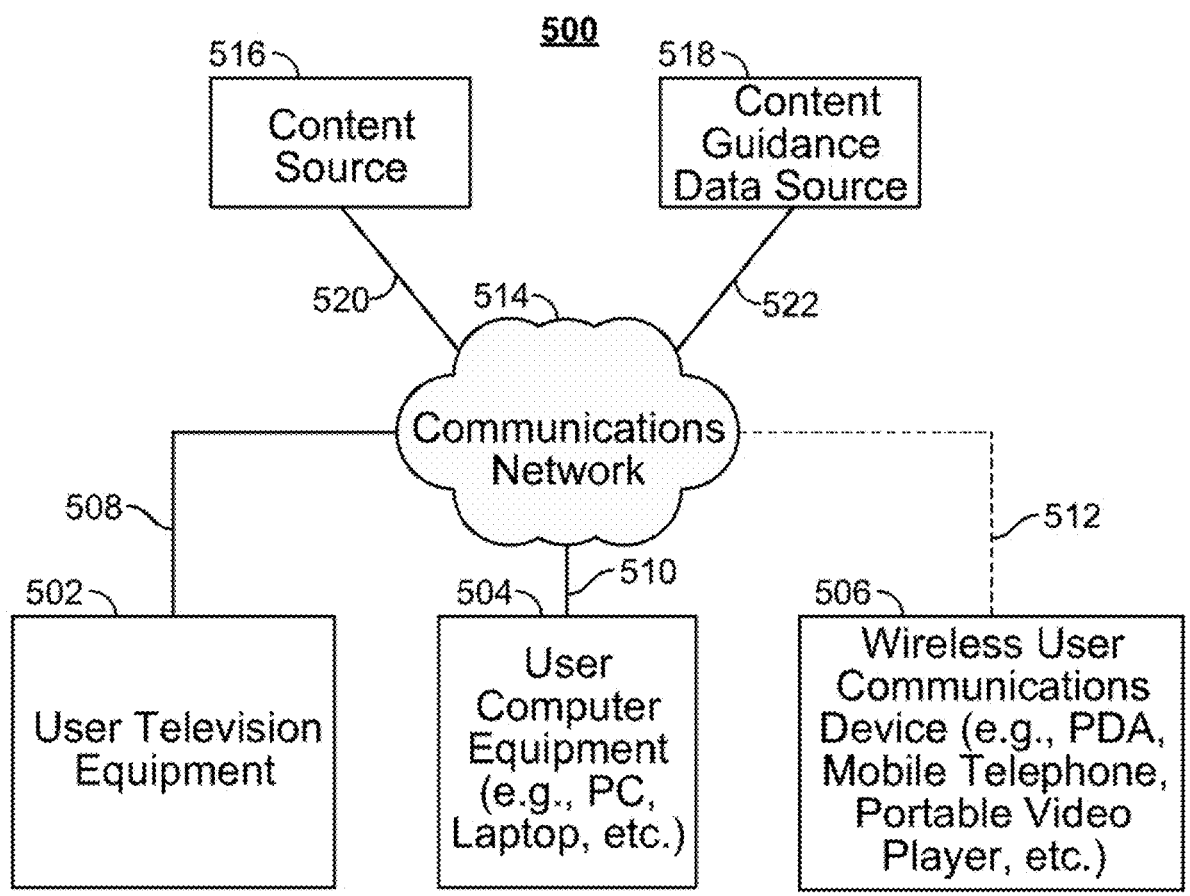
FIG. 5 is a block diagram of an illustrative device, in accordance with some embodiments of the disclosure.

Each one of device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or devices and may be substantially similar to devices described above. Devices, on which a application may be implemented, may function as a standalone device or may be part of a network of devices. Various network configurations of devices may be implemented and are discussed in more detail below.

A device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the content application may be provided as a web site accessed by a web browser. In another example, the content application may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

In some embodiments, a device (e.g., user television equipment 502, user computer equipment 504, wireless user communications device 506) may be referred to as a "second device." For example, a second device may provide an interface for adjusting settings and display preferences of the first device. In some embodiments, the second device is configured for interacting with other second devices or for interacting with a social network. The second screen device can be located in the same room as the first device, a different room from the first device but in the same house or building, or in a different building from the first device.

The user may also set various settings to maintain consistent application settings across in-home devices and remote devices. For example, if a user enables buffering of related content segments on their personal computer at their office, this feature would also be enabled on the user's in-home devices (e.g., user television equipment and user computer equipment) as well as the user's mobile devices, if desired. Therefore, changes made on one device can change the content experienced on another device, regardless of whether they are the same or a different type of device. In addition, the changes made may be based on settings input by a user, as well as user activity monitored by the content application. In addition, two devices can work together to provide functionality for the user. For example, a first device can determine a current portion of the content being output to a user and instruct a second device to determine a characteristic of the current portion or related content segments based on a determined characteristic.

The devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 502-11x, etc.), or other short-range communication via wired or wireless paths. BLUETOOTH is a certification mark owned by Bluetooth SIG, INC. The devices may also communicate with each other directly through an indirect path via communications network 514.

System 500 includes content source 516 and content data source 518 coupled to communications network 514 via communication paths 520 and 522, respectively. Paths 520 and 522 may include any of the communication paths described above in connection with paths 508, 510, and 512. Communications with the content source 516 and content data source 518 may be exchanged over one or more communications paths but are shown as a single path in FIG. 5 to avoid overcomplicating the drawing. In addition, there may be more than one of each of content source 516 and content data source 518, but only one of each is shown in FIG. 5 to avoid overcomplicating the drawing. If desired, content source 516 and content data source 518 may be integrated as one source device. Although communications between sources 516 and 518 with devices 502, 504, and 506 are shown as through communications network 514, in some embodiments, sources 516 and 518 may communicate directly with devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 518 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 518 may be provided to user's equipment using a client-server approach. For example, a user equipment device may pull content data from a server, or a server may push content data to a user equipment device. In some embodiments, a content application client residing on the user's equipment may initiate sessions with source 518 to obtain content data when needed, e.g., when the content data is out of date or when the device requests the data. Content data may be provided to the user equipment with any suitable frequency (e.g., continuously, daily, a user-specified period of time, a system-specified period of time, in response to a request from user equipment, etc.). Content data source 518 may provide devices 502, 504, and 506 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content or content segments (e.g., characteristics of content portions, content segments related to a current portion of content based on a characteristic). The content data may also include user profiles used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., content data source 518) running on control circuitry of the remote server. When executed by control circuitry of the remote server (such as content data source 518), the application may instruct the control circuitry to generate the content displays and transmit the generated displays to the devices. The server application may instruct the control circuitry of the content data source 518 to transmit data for storage on the device. The client application may instruct control circuitry of the receiving user equipment to generate the content displays.

Content and/or content data delivered to devices 502, 504, and 506 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 500 is intended to illustrate a number of approaches, or network configurations, by which devices and sources of content and content data may communicate with each other for the purpose of accessing content and providing the ability to buffer content segments based on characteristics of currently consumed content portions. The embodiments described herein may be applied in any one or a subset of these approaches, or in a system employing other approaches for delivering content. The following four approaches provide specific illustrations of the generalized example of FIG. 5.

In one approach, devices may communicate with each other within a home network. Devices can communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may use content navigation button 120 on one device while the content is transmitted to a second device to be generated for display.

In a second approach, users may have multiple types of user equipment by which they access content. For example, some users may have home networks that are accessed by in-home and mobile devices. Users may control in-home devices via a application implemented on a remote device. For example, users may access an online application on a website via a personal computer at their office, or a mobile device such as a PDA or web-enabled mobile telephone. The user may set various settings (e.g., recordings, reminders, content segment buffering enablement, or other settings) on the online content application to control the user's in-home equipment. The online application may control the user's equipment directly, or by communicating with a application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home can use their application to communicate directly with content source 516 to access content. Specifically, within a home, users of user television equipment 502 and user computer equipment 504 may access the application to navigate among and locate desirable content. Users may also access the application outside of the home using wireless user communications devices 506 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more content data sources 518. In addition or in the alternative, the remote computing sites may include other devices, such as user television equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, a application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, devices can use cloud resources for processing operations such as the processing operations performed by processing circuitry described in relation to FIG. 4.

Any one or more of device 400 and user equipment system 401 of FIG. 4 and user television equipment 502, user computer equipment 504, and wireless user communications device 506 of FIG. 5 can be used to provide a thorough and efficient content consumption experience. For example, the devices of the present disclosure can buffer related content segments based on segment characteristics, reducing time spent manually scanning through content. Further details of the present disclosure are discussed below in connection with the flowcharts of FIGS. 6-8.

Figure 6:
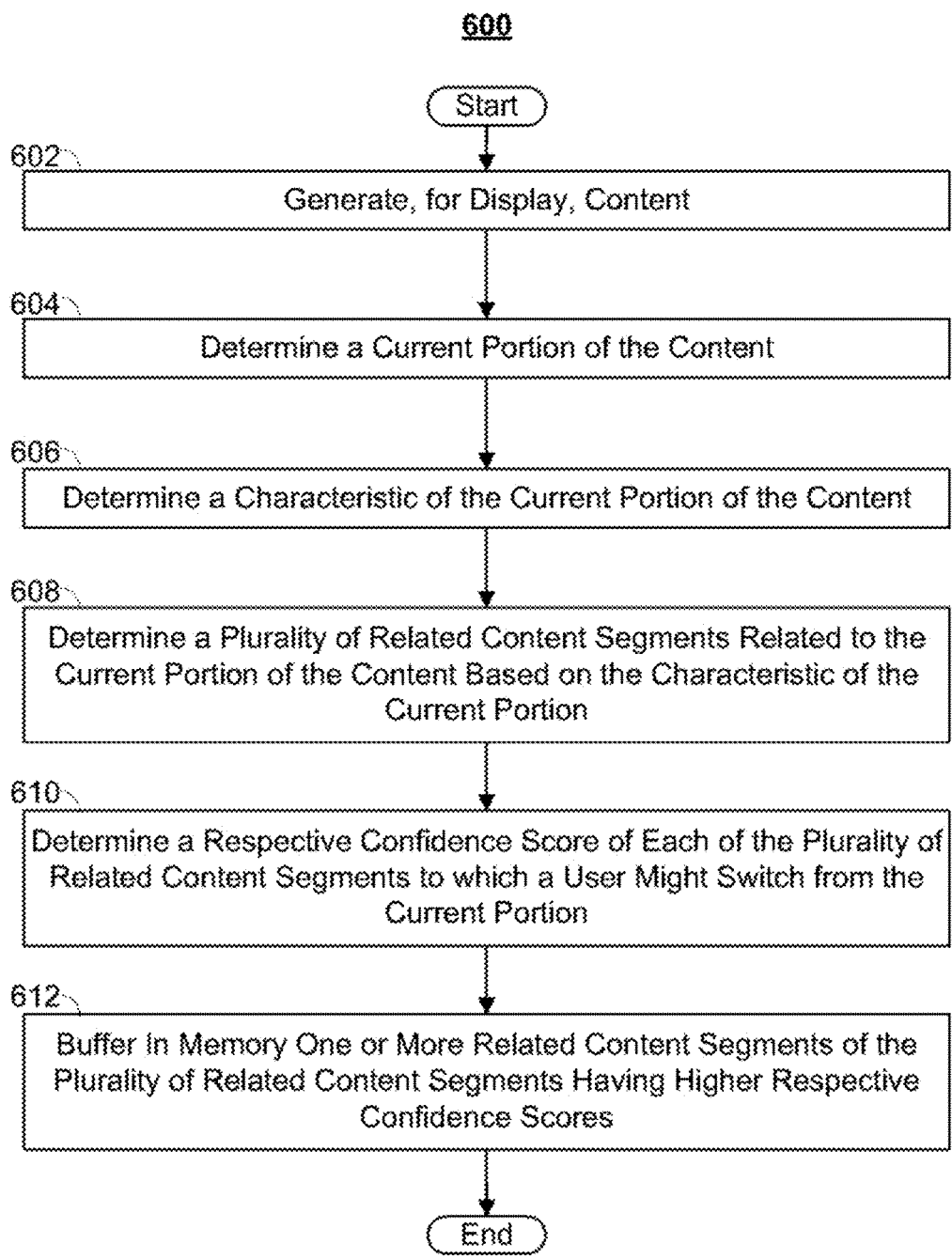
FIG. 6 depicts an illustrative flowchart of a process for buffering related content segments, in accordance with some embodiments of the disclosure.

FIG. 6 depicts an illustrative flowchart of a process 600 for buffering related content segments, in accordance with some embodiments of the disclosure. It should be noted that the steps of process 600 can be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5), part of a remote server separated from the user equipment by way of a communication network (e.g., communication network 514 of FIG. 5), or distributed over a combination of both.

At step 602, the system generates, for display, content. The system may generate content for display on a display 412 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 414 such as stereo speakers, headphones, portable speakers, or any other suitable device that outputs audio.

At step 604, the system determines a current portion of the content. A current portion can include at least one of audio and visual components of content. For current portions comprising visual components, the portion may be a single video frame or series of video frames (e.g., video frames that comprise a specific movement that an actor does). For example, the current portion of a television series may be the gesture that a superhero makes before he uses his superpower. As another example, the current portion may be a single video frame that shows an integrated sponsor logo on a computer in the foreground of the frame. For current portions comprising audio components, the portion may include a spoken word, phrase, or music. For example, the current portion of a stand-up comedy album may be the first occurrence of a punchline that the comedian makes a reference to towards the end of the album. As another example, the current portion of a movie can be a series of video frames accompanied by a musical score. The system may determine a current portion of the content during its output by using the content presented at a predetermined time before and after the frame currently being presented to understand context for potential current portions (e.g., if the user is currently watching at the 30:00-minute mark, the system may use 28:00-32:00 to determine the current portion). Current portions may also be predetermined by the content provider or by control circuitry (e.g., control circuitry 404) prior to the generation for display of the content. In some embodiments, control circuitry determines the current portion of the content. For example, the control circuitry can determine the portion of a movie being consumed that is accompanied by one song in a musical score.

At step 606, the system determines a characteristic of the current portion of the content. A characteristic can include featured actors, music, sound effects, location, plot information, segment description, special effects, time of occurrence in the content, screenwriter, director, producer, integrated sponsor, brightness, dialogue, any feature that classifies audio or visual content, or any suitable combination thereof. The characteristic may be determined during content output through facial recognition features, image-to-text parsing, or any other suitable recognition algorithm. The characteristic may also be determined prior to content output and retrievable from a metadata file of the content. In some embodiments, control circuitry 404 determines the characteristic of the current portion of the content. For example, the control circuitry can determine that a characteristic of a portion of a movie is its orchestral music score that pairs with dramatic scenes. In this example, each frame of the movie could be annotated with a corresponding musical score that the system uses to determine the characteristic. Another way that the characteristic could be determined in this example is by using a music recognition algorithm using speech processing and a database to identify the song that characterizes the portion of the movie.

At step 608, the system determines content segments related to the current portion of the content based on the characteristic of the current portion of the content. The system may begin determining related content segments by first determining the likelihood of the user navigating away from the current portion of the content. For example, the system determines segments related to a scene with a superhero upon determining that user is likely to navigate away because the superhero is not interesting to the user. In another example, the system may determine that the user is likely to navigate away from a current portion in a television episode because when the user has previously viewed this portion or similar portions, the user has navigated away a sufficient number of times before to a segment in a previous episode.

Content segments related to the current portion may be related based on a shared characteristic with the current portion of the content. In one embodiment, the related content segment has the same character as one in the current portion. This relationship is relevant for situations where a user wishes to seek a segment prior to the current portion or after the current portion. For example, when the user returns to watching an episode in the middle of a season of episodes after not watching for over a month, the user may be confused as to what last happened to the character when the user last watched the content. To give the user quick access to content from previous episodes, the system may buffer segments of previous episodes that include the character. In another example, the current portion shows a car chase and the user may only want to watch segments in a movie with car chases. The system may use the activity of "car chase" as the determined characteristic to find other content segments also having car chases. The user can instantly and seamlessly play all the car chases of the movie one after the other (e.g., using seek buttons 121 (FIG. 1) or 221 (FIG. 2), or the system may offer an automatic content output feature of related content segments).

In some embodiments, the related content segments may have been buffered previously while they were being presented and retained in memory. As the user consumes a current portion of content, the system may determine a high likelihood that the user will come back to this portion when he watches a following segment. For example, the scene in a movie that is at the 90-minute mark may make a reference to what is happening currently at the 15-minute mark, and, after viewing up to and including the 90-minute mark, viewers may typically rewind back to the current portion to watch what happened again. In this example, the system can use an average of confidence scores taken from multiple users to determine the high confidence score that the user will navigate away from the 90-minute mark to the 15-minute mark. The system may also use the viewing pattern of the individual user to determine this confidence score. Because the system has retained the current portion in memory, the user may consume the related content segment almost instantly when he previously may have had to manually rewind back to the earlier, related segment.

Figure 7:
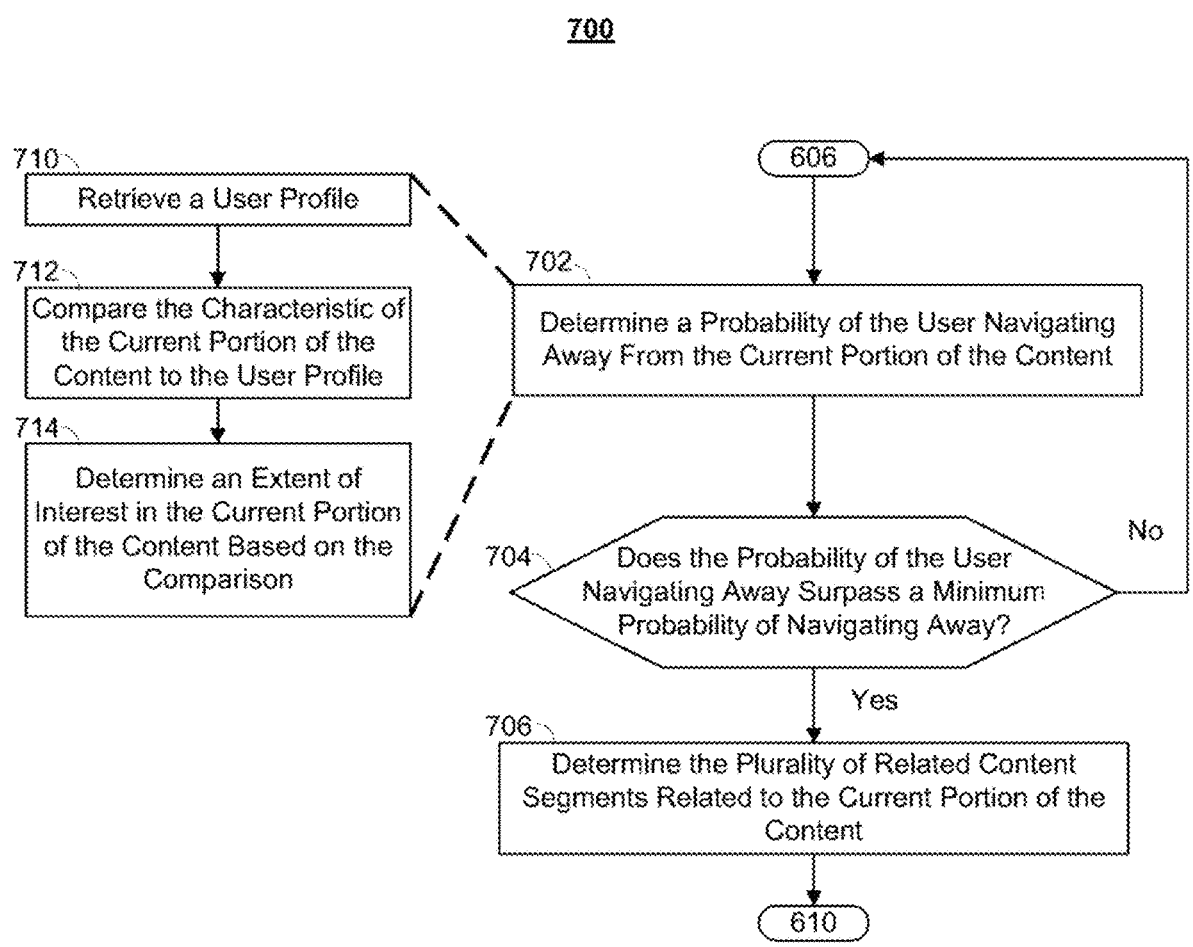
FIG. 7 depicts an illustrative flowchart of a process for determining related content segments, in accordance with some embodiments of the disclosure.

Content segments may be related to the current portion based on an indirect relationship as opposed to a direct relationship (e.g., a shared actor, musical composer, activity, etc.). An indirect relationship may include a chronological proximity to the current segment (e.g., segments may be related because they occur chronologically after the current portion). For example, scenes five and six are related to scene four because they occur consecutively after the fourth scene. This relationship may be used when the system has determined a characteristic and is identifying the closest segment with that characteristic before or after the current portion. In one example, the user profile indicates that the user likes the music of a movie the user is watching, and the system will find the segments closest to the current portion that also have the background music. The user in this example may prefer to stay within a certain time of the current portion as opposed to navigating farther away than a few segments away. An indirect relationship may include an opposing relationship to the characteristic of the current portion. For example, the current portion is characterized as violent, and the user does not like violence. The system may determine that the user is likely to navigate away to the next scene without violence, determining related segments by using their lack of the characteristic or having attributes that are the opposite of the characteristic. In some embodiments, the process of FIG. 7 may be used to perform step 608. FIG. 7 is discussed further below.

At step 610, the system determines a respective confidence score of each of the related content segments to which a user might switch from the current portion. In some embodiments, the confidence score of a segment is the extent that the user is interested in the segment. The extent of interest may be determined by comparing a characteristic of the current portion with a characteristic of the segment that the user may switch to. For example, a user who is navigating away from an episode of a television series to understand what happened in a previous episode of the series may be more interested in finding a segment in an earlier episode with the same characters or location that characterizes the current portion.

The confidence score may be based on a single user profile or an aggregate of multiple user profiles. In the previous example, the user profile may provide the system an indication that the user is interested in segments with a shared character or location. The user profile may indicate that the last time the user watched that portion was over a month ago, suggesting the user may want context to refresh his or her memory. In some embodiments, the system may use the viewing patterns of multiple users, stored in a user profile, to determine that related segment by the high number of times users have navigated away from the current portion of content to a specific segment. The user profile may be a database that is known only to the system or a collection of information that can be seen and edited by the user to share with other users. The confidence score can be based on viewing history. For example, seven out of ten times that a user has watched the current portion of content, the user has navigated away from the current portion to the segment for which the system is determining a confidence score. In that example, the system determines the confidence score is 70%.

The confidence score may be based on the probability of the user navigating away from a different portion or to different segments from different content. For example, the user has watched The Avengers and is currently watching Star Wars: The Force Awakens, which are contextually and chronologically unrelated to each other. The user frequently navigates from the very first scene in The Avengers to any action scene in the movie. The system may, when the user begins watching Star Wars, determine that related segments are ones involving action. However, when the user is playing back Star Wars towards the middle of the movie, the system determines a low confidence score for those same action scenes because the viewing pattern does not suggest the user is likely to switch to action scenes unless the movie has just begun. The confidence score may be an average or a weighted average from confidence scores of multiple segments. In the previous example, the confidence score may be calculated from the viewing patterns of the user skipping from the first scene to an action scene in The Avengers, Star Trek, The Lord of the Rings, and other fantasy/action movies. The weighted average in confidence score determinations may involve giving a higher weight to segments that are more similarly characterized to the current portion. For example, the viewing patterns of the user when watching Star Trek may be given higher weight during the confidence score determinations while watching Star Wars, since both are located in outer space, than The Lord of the Rings, which does not involve interplanetary travel.

Figure 8:
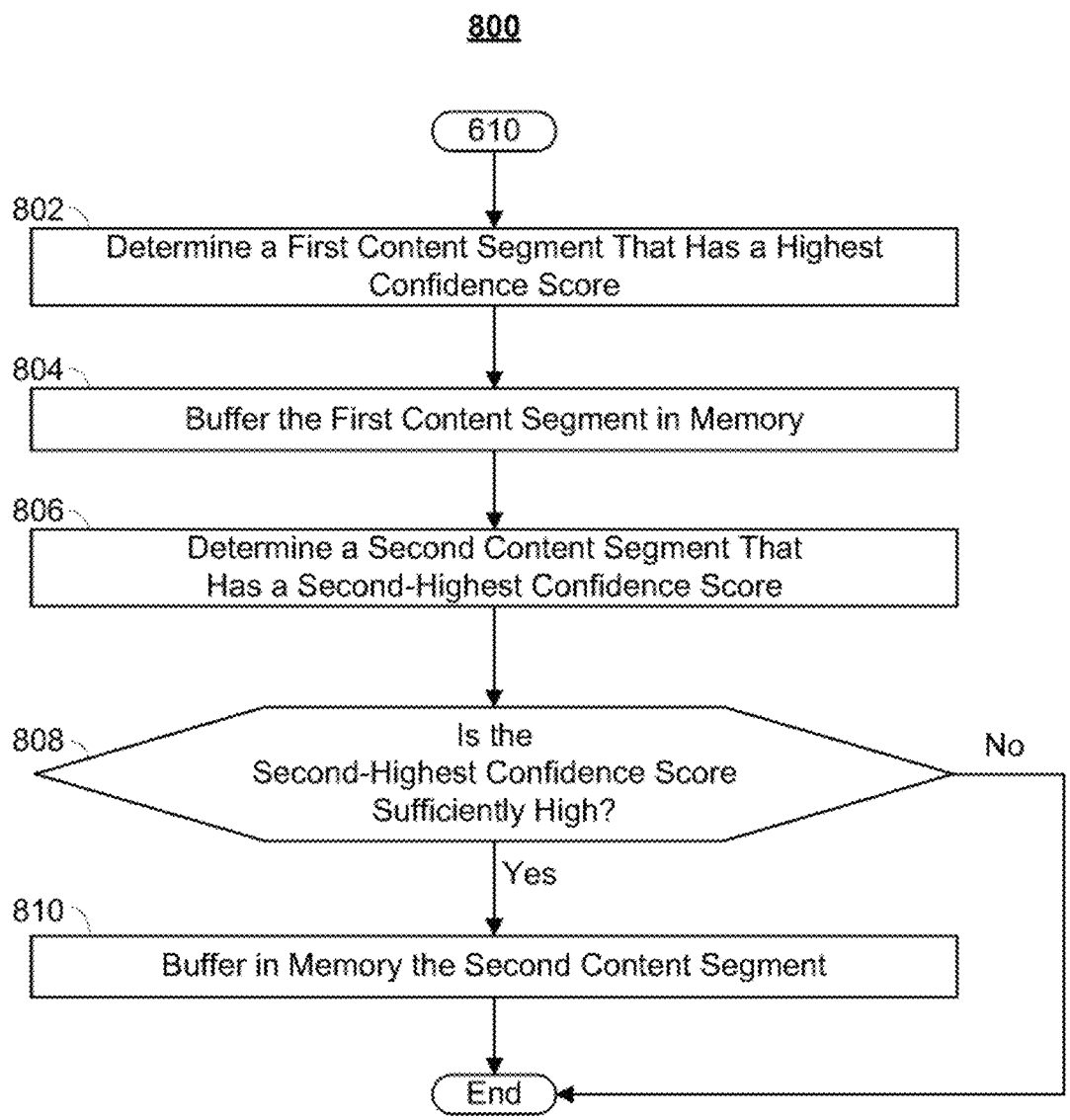
FIG. 8 depicts an illustrative flowchart of a process for buffering related content segments based on confidence scores, in accordance with some embodiments of the disclosure.

At step 612, the system buffers in memory one or more of the related content segments that have higher respective confidence scores. The system can buffer the segment with the highest confidence score or multiple segments with high confidence scores. In some embodiments, the process of FIG. 8 may be used to perform step 612. FIG. 8 is discussed further below. It will be understood that process 600 is merely illustrative and that various modifications can be made in accordance with the present disclosure.

FIG. 7 depicts an illustrative flowchart of a process 700 for determining related content segments, in accordance with some embodiments of the disclosure. Related content segments may be determined through a database from the content provider, during the output of the content, or through a database of previous system determinations, or any suitable combination thereof. For example, the content provider may include a metadata file that denotes related segments for each segment (e.g., the content provider has labeled each segment with digital fingerprints linking it to other segments based on characteristics, where there is one set of fingerprint link per characteristic). The system may determine related content segments during the output of the content. These determinations may be stored in a database, utilizing storage 408, which may be stored either locally on the device with control circuitry 404 or remotely through a cloud-based storage, to avoid repetitive determinations. It should be noted that the steps of process 700 can be performed by control circuitry 404 of FIG. 4.

At step 702, the system determines a probability of the user navigating away from the current portion of the content. The act of navigating away may include, while consuming one content, using the manual rewind button 122 (FIGS. 1-2) or manual forward button 123 (FIGS. 1-2) to navigate to another part of the content, selecting a different content to output, or pausing consumption of the current content. For example, when a user is listening to a music album song by song, the system may determine a probability that the user selects the third song in the listing when the user is listening to a portion of the first song. As another example, when the user may elect to pause the presentation of a movie, the system may characterize this action as a navigation away (e.g., the system will determine a probability that the user will pause at a certain scene in the movie). In some embodiments, step 702 can be further broken into steps 710, 712, and 714.

At step 710, the system retrieves a user profile. A user profile may comprise the user interests, viewing history, favorite content, current mood, current location, any suitable description of the user, or any combination thereof.

At step 712, the system compares a characteristic of the current portion of the content to the user profile. The current portion may compare directly through a shared characteristic with the user profile. For example, each episode of a television series may be directed by different directors, and the director for one of those episodes may be of interest to the user as indicated by his or her user profile. In this example, the comparison would produce a direct match between the director of that episode and the listed director in the user profile. The current portion may compare indirectly through a lack of a characteristic. For example, a movie that is characterized as both action and comedy may be interesting to a user only when he plays the comedic part. The user profile states the user enjoys the comedy genre, and the system will use this to compare to a current portion of the movie that is not characterized by comedy but rather by action. The system may then, in step 714, determine the extent of interest that the user who likes comedy would have in the current action portion.

At step 714, the system determines an extent of interest in the current portion of the content based on the comparison of step 712. The extent of interest may be determined by analyzing the viewing patterns of the user. In some embodiments, the system uses the number of times the user navigates away from the current portion due to a characteristic out of the total number of times the user has watched the current portion. For example, a user has used the fast-forward button two out of ten times he has viewed a current portion of a movie. The system would then determine the extent of interest in the current portion to be twenty percent. The viewing patterns may be based upon the previous times the user has consumed other, similar portions. The percentage of times the user has navigated away from a similarly characterized portion may be used to determine the extent of interest in the current portion. For example, a user is listening to a song for the first time that features a rapper, but the user has previously skipped rap songs or the rap portions of songs. In this example, the system may determine the extent of interest in the current, rap portion of the song is zero percent. The extent of interest need not be a percentage and may be any other representation of an amount to be used in comparison with other amounts (e.g., a ranking scale from 0 to 10). The extent of interest may be used to determine related content segments after a preliminary analysis of the extent of interest done in step 704.

At step 704, the system determines whether the probability of the user navigating away surpasses a minimum probability of navigating away. If the determined probability is greater than the minimum probability of navigating away, then the system proceeds to step 706 to determine the related content segments. The minimum probability of navigating away could be user-determined, predetermined by the system for all content, or predetermined by the system based upon the type of content. If the determined probability is less than the minimum probability of navigating away, then the system returns to step 606 to determine another characteristic of the current portion of content which then is used to recalculate the probability of the user navigating away. For example, if the user is watching a scene of a movie that is characterized by romance and the director Michael Bay, the system first uses the characteristic of romance and the user profile to determine that the user is not likely to navigate away because she likes romance movies. However, the system may then use the director as the characteristic in process 600, retrieve from the user profile a disinterest in the director Michael Bay, and determine that the user is likely to navigate away from the current portion. The system may weigh characteristics differently. In the previous example, the system weighed the characteristic of "director" higher than "genre," determining that the user is likely to navigate away because the director affects the probability of navigating away more than the genre does. The weight of characteristics in determining the probability of navigating away may be user-specified or system pre-determined.

At step 706, the system determines related content segments related to the current portion of the content. In some embodiments, the system may determine that all content segments with a probability of the user navigating away that is higher than a minimum probability of navigating away are related content segments. For example, if a user is watching a compilation of highlights of a sporting event, the system may determine that all content segments in the compilation are likely to be interesting to the user because of an interest in sports highlights indicated in the user profile. In other embodiments, when the user profile indicates an interest in sports highlights only involving the athlete Kobe Bryant, the system will determine only a fraction of the sports highlight compilation that contain Bryant are related content segments. In some embodiments, the related content segments are obtained from a metadata file. For example, a movie may have a metadata file associated with each frame of video, wherein the file notes which related videoframes and/or the characteristics at which they are related to a respective frame. With the related content segments, the system may proceed to step 610 to determine the confidence score of the respective content segments. It will be understood that process 700 is merely illustrative and that various modifications can be made in accordance with the present disclosure.

FIG. 8 depicts an illustrative flowchart of a process 800 for buffering related content segments based on confidence scores, in accordance with some embodiments of the disclosure. In some embodiments, the memory containing the buffer may be located on the same device having display 412, as to provide the user the most instant access to buffered segments. In some embodiments, process 800 follows immediately after step 610, where respective confidence scores of related content segments are determined.

At step 802, the system determines the content segment that has the highest confidence score. In some embodiments, the confidence scores may be the probability that a user will skip to a segment from a portion of the current segment. For example, in reference to FIG. 3, a user may be 45% interested in skipping from the fourth scene 310 to the seventh scene 313 in a movie as indicated by confidence score 303. The system determines that, among confidence scores 301, 302, 303, and 304, confidence score 303 is the highest confidence score.

At step 804, the system buffers the content segment with the highest score in memory. In the previous example, the system buffers the seventh scene 313 of a movie such that the user can almost instantly watch the scene when the user uses following-segment-seek button 121 (FIG. 1) to select a segment after the current scene.

At step 806, the system determines the content segment that has the second-highest confidence score. The eighth scene 314 of FIG. 3 has the second-highest confidence score 304 of 40% among scenes 311, 312, 313, and 314. In some embodiments the second-highest confidence score may have the same score as that of the buffered content segment in step 804. For example, there may be two scenes in a movie that a user is equally likely to navigate away to from the current scene.

At step 808, the system determines whether the second-highest confidence score is sufficiently high. In some embodiments, the system determines through confidence score thresholds whether the second-highest confidence score is sufficiently high. For example, when the confidence score threshold is 35% and the second-highest confidence score is 40%, the system determines that the second-highest confidence score is sufficiently high because it is greater than the threshold. In some embodiments, the system uses a confidence range within the highest confidence score to determine if the second-highest confidence score is sufficiently high. For example, when the confidence range is within 10% of the highest confidence score and the highest confidence score is 45%, a second-highest score that is 35% or higher will be considered sufficiently high. Both the thresholds and ranges may be user-specified or pre-determined by the system. If the second-highest score is not sufficiently high, the system may not buffer the content segment with the corresponding second-highest confidence score.

At step 810, the system buffers the second content segment in memory if the second-highest confidence score is sufficiently high. In both threshold and range examples mentioned previously, the second-highest confidence score of 40% is sufficiently high. This confidence score is illustrated in FIG. 3 as score 304, which corresponds to the eighth scene 314. The system will buffer in memory the eighth scene 314 because the confidence score was determined to be sufficiently high in step 808. It will be understood that process 800 is merely illustrative and that various modifications can be made in accordance with the present disclosure.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for buffering portions of content, the method comprising:
generating for display content for a user, the content comprising an episode of a series;
determining a current portion of the content;
determining a characteristic of the current portion of the content;
accessing a plurality of content segments previously viewed by the user, the plurality of content segments from one or more episodes of the series viewed before the episode of the series;
determining, from the plurality of content segments previously viewed by the user, a first related content segment related to the current portion of the content based on the determined characteristic of the current portion;
determining, from the plurality of content segments previously viewed by the user, a second related content segment related to the current portion of the content based on the determined characteristic of the current portion;
determining a first confidence score to which the user might switch from the current portion to the first related content segment;
determining a second confidence score to which the user might switch from the current portion to the second related content segment;
determining whether the first confidence score is greater than the second confidence score;
in response to determining the first confidence score is greater than the second confidence score, buffering in memory the first related content segment; and
in response to determining the first confidence score is not greater than the second confidence score, buffering in the memory the second first related content segment.

2. The method of claim 1, further comprising:
receiving a user selection to switch to a content segment of one of the following: the first related content segment and the second related content segment;
retrieving the content segment from the buffered memory; and
generating for display the content segment retrieved from the buffered memory.

3. The method of claim 1, wherein the plurality of related content segments comprises a portion of the content and a portion of a second content.

4. The method of claim 1, further comprising:
determining whether the current portion of the content is related to another segment of content;
determining a likelihood that the user will switch back to the current portion of the content when the another segment of content is being generated for display; and
maintaining the current portion of the content buffered in memory when it is determined that the likelihood that the user will switch back to the current portion of the content is greater than a predetermined threshold.

5. The method of claim 1, wherein determining the plurality of related content segments related to the current portion of the content based on the characteristic of the current portion comprises:
determining a probability of the user navigating away from the current portion of the content; and
in response to determining that probability of the user navigating away from the current portion of the content surpasses a minimum probability of navigating away, determining the plurality of related content segments related to the current portion of the content.

6. The method of claim 5, wherein determining the probability of the user navigating away from the current portion of content comprises:
retrieving a user profile, wherein the user profile comprises one or more of viewing history, mood, and one or more characteristics of interest;
comparing the characteristic of the current portion of the content to the user profile; and
determining an extent of interest in the current portion of the content based on the comparison.

7. The method of claim 1, wherein the determining the first confidence score to which the user might switch from the current portion to the first related content segment comprises:
retrieving an indication of an average extent of interest by other users in the first related content segment; and
determining an extent of interest in the first related content segment based on the characteristic of the current portion and the respective indication of the average extent of interest.

8. The method of claim 1 further comprising:
determining a respective confidence score for each remaining of the plurality of related content segments;

determining a subset of the remaining of the plurality of related content segments based on whether the respective confidence score for each remaining of the plurality of related content segments is above a predetermined threshold;

buffering in the memory, during display of the current portion of content, one or more of the determined subset of the remaining of the plurality of related content segments.

9. The method of claim 1, wherein the characteristic of the current portion of the content is one of an audio characteristic of the background audio, a language spoken, an actor, an emotion, a genre, an integrated sponsor, and a character.

10. The method of claim 1, wherein determining the plurality of related content segments comprises:

retrieving a metadata file of characteristics for portions of the content; and determining a plurality of related content segments related to the current portion of the content based on the characteristic of the current portion and an analysis of the metadata file.

11. A system for buffering portions of content, the system comprising:

memory; and processing circuitry configured to:

generate for display content for a user, the content comprising an episode of a series;

determine a current portion of the content;

determine a characteristic of the current portion of the content;

access a plurality of content segments previously viewed by the user, the plurality of content segments from one or more episodes of the series viewed before the episode of the series;

determine, from the plurality of content segments previously viewed by the user, a first related content segment related to the current portion of the content based on the determined characteristic of the current portion;

determine, from the plurality of content segments previously viewed by the user, a second related content segment related to the current portion of the content based on the determined characteristic of the current portion;

determine a first confidence score to which the user might switch from the current portion to the first related content segment;

determine a second confidence score to which the user might switch from the current portion to the second related content segment;

determine whether the first confidence score is greater than the second confidence score;

in response to determining the first confidence score is greater than the second confidence score, buffering in the memory the first related content segment; and in response to determining the first confidence score is not greater than the second confidence score, buffering in the memory the second first related content segment.

12. The system of claim 11 further comprising:

input/output circuitry configured to receive a user selection to switch to a content segment of one of the following: the first related content segment and the second related content segment; and wherein the processing circuitry is further configured to:

retrieve the content segment from the buffered memory; and generate for display the content segment retrieved from the buffered memory.

13. The system of claim 11, wherein the plurality of related content segments comprises a portion of the content and a portion of a second content.

14. The system of claim 11, wherein the processing circuitry is further configured to:

determine whether the current portion of the content is related to another segment of content;

determine a likelihood that the user will switch back to the current portion of the content when the another segment of content is being generated for display; and maintain the current portion of the content buffered in the memory when it is determined that the likelihood that the user will switch back to the current portion of the content is greater than a predetermined threshold.

15. The system of claim 11, wherein the processing circuitry is further configured, when determining the plurality of related content segments related to the current portion of the content based on the characteristic of the current portion, to:

determine a probability of the user navigating away from the current portion of the content; and in response to the determining that the probability of the user navigating away from the current portion of the content surpasses a minimum probability of navigating away, determine the plurality of related content segments related to the current portion of the content.

16. The system of claim 15, wherein the processing circuitry is further configured, when determining the probability of the user navigating away from the current portion of content, to:

retrieve a user profile, wherein the user profile comprises one or more of viewing history, mood, and one or more characteristics of interest;

compare the characteristic of the current portion of the content to the user profile; and determine an extent of interest in the current portion of the content based on the comparison.

17. The system of claim 11, wherein the processing circuitry is further configured, when determining the first confidence score to which the user might switch from the current portion to the first related content segment, to:

retrieve an indication of an average extent of interest by other users in the first related content segment; and determine an extent of interest in the first related content segment based on the characteristic of the current portion and the respective indication of the average extend of interest.

18. The system of claim 11, wherein the processing circuitry is further configured to:

determine a respective confidence score for each remaining of the plurality of related content segments;

determine a subset of the remaining of the plurality of related content segments based on whether the respective confidence score for each remaining of the plurality of related content segments is above a predetermined threshold;

buffer in the memory, during display of the current portion of content, one or more of the determined subset of the remaining of the plurality of related content segments.

19. The system of claim 11, wherein the characteristic of the current portion of the content is one of an audio characteristic of the background audio, a language spoken, an actor, an emotion, a genre, an integrated sponsor, and a character.

20. The system of claim 11, wherein the processing circuitry is further configured, when determining the plurality of related content segments, to:
  retrieve a metadata file of characteristics for portions of the content; and
  determine a plurality of related content segments related to the current portion of the content based on the characteristic of the current portion and an analysis of the metadata file.

\* \* \* \* \*